(12) United States Patent
Natarajan

(10) Patent No.: US 8,517,596 B2
(45) Date of Patent: Aug. 27, 2013

(54) USING A MICROFLUID MIXER

(75) Inventor: Govindarajan Natarajan, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/413,019

(22) Filed: Mar. 6, 2012

(65) Prior Publication Data

US 2012/0163116 A1 Jun. 28, 2012

Related U.S. Application Data

(62) Division of application No. 11/834,973, filed on Aug. 7, 2007, now Pat. No. 8,206,025.

(51) Int. Cl.
*B01F 11/00* (2006.01)
*B01F 15/06* (2006.01)

(52) U.S. Cl.
USPC ............ 366/146; 366/147; 366/275; 366/333

(58) Field of Classification Search
USPC ............ 366/275, 176.1, 177.1, 181.6, 181.8, 366/341, 340, 144, 147; 417/395, 413.1, 417/422, 412–423.2; 92/98 R, 100
See application file for complete search history.

(56) References Cited

U.S. PATENT DOCUMENTS

| | | | |
|---|---|---|---|
| 1,738,565 A | 12/1929 | Claypoole | |
| 2,462,554 A * | 2/1949 | Robinson | ...................... 241/153 |
| 3,382,534 A | 5/1968 | Veazey | |
| 3,701,619 A | 10/1972 | Appeldoorn et al. | |
| 3,881,701 A | 5/1975 | Schoenman et al. | |
| 3,977,887 A | 8/1976 | McIntosh | |
| 4,971,738 A | 11/1990 | Herron et al. | |
| 4,991,283 A | 2/1991 | Johnson et al. | |
| 4,996,004 A * | 2/1991 | Bucheler et al. | .............. 424/401 |
| 5,029,805 A | 7/1991 | Albarda et al. | |
| 5,058,856 A | 10/1991 | Gordon et al. | |
| 5,176,358 A | 1/1993 | Bonne et al. | |
| 5,190,373 A | 3/1993 | Dickson et al. | |
| 5,421,715 A | 6/1995 | Hofstetter et al. | |
| 5,489,465 A | 2/1996 | Natarajan et al. | |
| 5,534,328 A | 7/1996 | Ashmead et al. | |
| 5,542,821 A | 8/1996 | Dugan | |
| 5,595,712 A | 1/1997 | Harbster et al. | |
| 5,611,214 A | 3/1997 | Wegeng et al. | |

(Continued)

FOREIGN PATENT DOCUMENTS

CN 2809266 Y 8/2006

*Primary Examiner* — Tony G Soohoo
(74) *Attorney, Agent, or Firm* — Cantor Colburn LLP; Matthew Zehrer

(57) ABSTRACT

A method includes directing first and second fluids into a plurality of first ports fluidly connected to a mixing chamber disposed between a first plate and a base plate, guiding the first and second fluids into a mixing chamber, directing the first and second fluid into a plurality of second ports fluidly connected to the plurality of first ports, guiding the first and second fluids from the plurality of second ports into another mixing chamber disposed between a second plate and the first plate and fluidly connected to the mixing chamber, activating a heating element to heat one of the first and second fluids entering the mixing chamber, creating a temperature gradient between the first and second fluids entering the mixing chamber, and operating a diaphragm operatively associated with the mixing chamber and the another mixing chamber to agitate the first and second fluids to form a fluid mixture.

8 Claims, 8 Drawing Sheets

(56) References Cited

U.S. PATENT DOCUMENTS

| | | |
|---|---|---|
| 5,640,995 A | 6/1997 | Packard et al. |
| 5,690,763 A | 11/1997 | Ashmead et al. |
| 5,698,299 A | 12/1997 | Schmidt et al. |
| 5,725,363 A | 3/1998 | Bustgens et al. |
| 5,811,062 A | 9/1998 | Wegeng et al. |
| 5,836,750 A | 11/1998 | Cabuz |
| 5,882,571 A | 3/1999 | Kaltenbach et al. |
| 5,932,799 A | 8/1999 | Moles |
| 5,961,932 A | 10/1999 | Ghosh et al. |
| 5,976,286 A | 11/1999 | Natarajan |
| 6,007,187 A | 12/1999 | Kashino et al. |
| 6,062,681 A | 5/2000 | Field et al. |
| 6,097,406 A | 8/2000 | Lubinsky et al. |
| 6,186,659 B1 | 2/2001 | Schembri |
| 6,264,900 B1 | 7/2001 | Schubert et al. |
| 6,273,687 B1 | 8/2001 | Nogimori et al. |
| 6,367,964 B1 | 4/2002 | Schmelz et al. |
| 6,379,035 B1 | 4/2002 | Kubo et al. |
| 6,494,614 B1 | 12/2002 | Bennett et al. |
| 6,513,968 B2 | 2/2003 | Schembri |
| 6,520,197 B2 | 2/2003 | Deshmukh et al. |
| 6,523,560 B1 | 2/2003 | Williams et al. |
| 6,537,506 B1 | 3/2003 | Schwalbe et al. |
| 6,558,136 B1 | 5/2003 | Peng |
| 6,572,830 B1 | 6/2003 | Burdon et al. |
| 6,592,696 B1 | 7/2003 | Burdon et al. |
| 6,619,311 B2 | 9/2003 | O'Connor et al. |
| 6,694,998 B1 | 2/2004 | Hunnicutt |
| 6,725,882 B1 | 4/2004 | Shia et al. |
| 6,730,123 B1 | 5/2004 | Klopotek |
| 6,758,107 B2 | 7/2004 | Cabuz |
| 6,761,420 B2 | 7/2004 | Maluf et al. |
| 6,767,194 B2 | 7/2004 | Jeon et al. |
| 6,812,820 B1 | 11/2004 | Fouillet |
| 6,877,528 B2 | 4/2005 | Gilbert et al. |
| 6,910,797 B2 | 6/2005 | Falcon |
| 6,916,113 B2 | 7/2005 | Van de Goor et al. |
| 6,935,772 B2 | 8/2005 | Karp et al. |
| 6,939,032 B2 | 9/2005 | Cosby et al. |
| 6,960,235 B2 | 11/2005 | Morse et al. |
| 7,008,193 B2 | 3/2006 | Najafi et al. |
| 7,052,117 B2 | 5/2006 | Bibl et al. |
| 7,069,943 B2 | 7/2006 | Gilbert et al. |
| 7,114,541 B2 | 10/2006 | Howitz et al. |
| 7,118,917 B2 | 10/2006 | Bergh et al. |
| 7,143,785 B2 | 12/2006 | Maerkl et al. |
| 7,192,559 B2 | 3/2007 | Chow et al. |
| 7,195,393 B2 | 3/2007 | Potter |
| 7,241,423 B2 | 7/2007 | Golbig et al. |
| 7,359,124 B1 | 4/2008 | Fang et al. |
| 7,371,349 B2 | 5/2008 | Schembri |
| 7,411,331 B2 | 8/2008 | Dubowsky et al. |
| 7,485,454 B1 | 2/2009 | Jury et al. |
| 7,556,776 B2 | 7/2009 | Fraden et al. |
| 7,604,673 B2 | 10/2009 | Kaye et al. |
| 2001/0010661 A1 | 8/2001 | Schembri |
| 2002/0168278 A1 | 11/2002 | Jeon et al. |
| 2002/0182091 A1 | 12/2002 | Potter |
| 2002/0187074 A1 | 12/2002 | O'Connor et al. |
| 2004/0129371 A1 | 7/2004 | Natarajan et al. |
| 2004/0145967 A1 | 7/2004 | Honda |
| 2004/0228734 A1 | 11/2004 | Jeon et al. |
| 2005/0014129 A1 | 1/2005 | Cliffel et al. |
| 2005/0069462 A1 | 3/2005 | Humenik et al. |
| 2005/0069949 A1 | 3/2005 | Humenik et al. |
| 2005/0074340 A1 | 4/2005 | Xu et al. |
| 2005/0077657 A1 | 4/2005 | Ahmad et al. |
| 2005/0092681 A1 | 5/2005 | Higashino et al. |
| 2005/0153273 A1 | 7/2005 | Wikswo et al. |
| 2005/0153276 A1 | 7/2005 | Wikswo et al. |
| 2005/0158845 A1 | 7/2005 | Wikswo et al. |
| 2005/0287044 A1 | 12/2005 | Natarajan |
| 2006/0028908 A1 | 2/2006 | Suriadi et al. |
| 2006/0039831 A1 | 2/2006 | Natarajan et al. |
| 2006/0045766 A1 | 3/2006 | Harttig et al. |
| 2006/0057421 A1 | 3/2006 | Maria et al. |
| 2009/0092526 A1 | 4/2009 | Miller |

\* cited by examiner

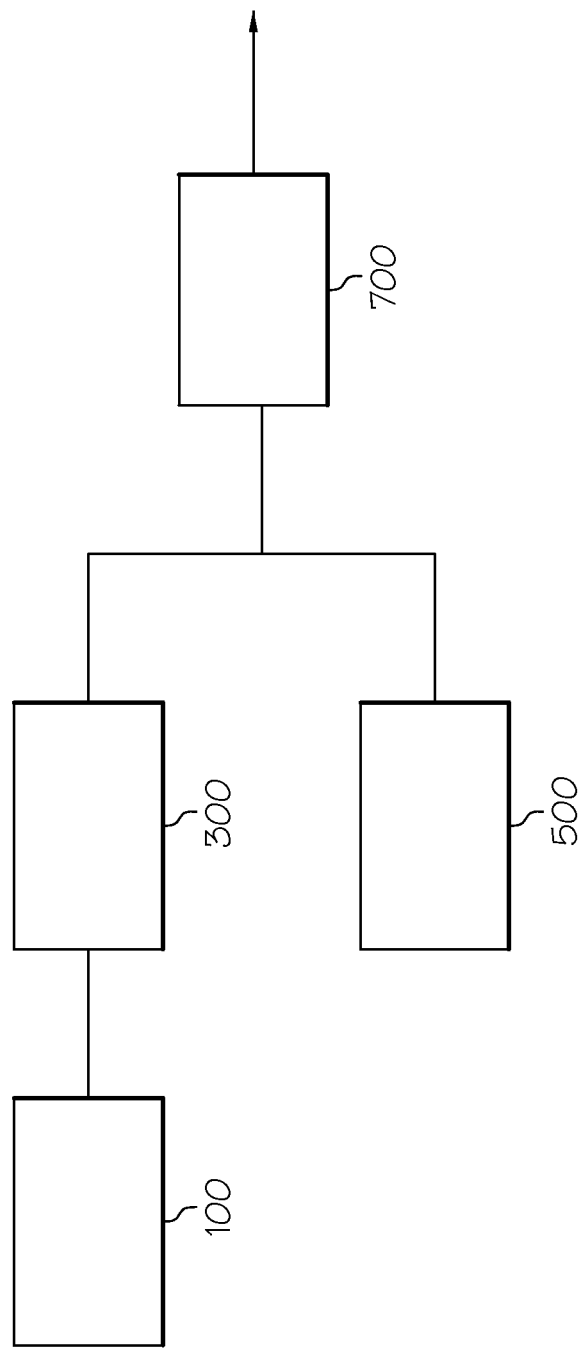

USING A MICROFLUID MIXER

CROSS-REFERENCE TO RELATED APPLICATION

This application is a divisional of U.S. application Ser. No. 11/834,973 filed Aug. 7, 2007, the disclosure of which is incorporated by reference herein in its entirety.

BACKGROUND

When fluids are present in microliter quantities, it is generally desirable to mix them in channels or passages having micrometer-sized dimensions so that the fluids are not wasted. However, fluids generally behave differently when they have to pass through channels and passages having micrometer-sized dimensions. For example, water flowing through a channel having a diameter equal to the width of a human hair behaves like honey. Even under pressure, the water travels less than one centimeter per second. Mixing of two different fluids in channels or passages that have micrometer-sized dimensions is therefore difficult because at such dimensions, the fluid's ability to flow in a turbulent manner is minimized. In channels or passages having micrometer-sized dimensions, static diffusion between two different fluids takes a prohibitively long time.

It is therefore desirable to have a mixer that can facilitate the mixing of a plurality of different fluids when the fluids are present in quantities on the order of microliters.

SUMMARY

Disclosed herein is a method including directing a first fluid and a second fluid into a plurality of first ports fluidly connected to a mixing chamber disposed between a first plate and a base plate, guiding the first and second fluids into a mixing chamber, directing the first and second fluid into a plurality of second ports fluidly connected to the plurality of first ports, guiding the first and second fluids from the plurality of second ports into another mixing chamber disposed between a second plate and the first plate and fluidly connected to the mixing chamber, activating a heating element to heat one of the first and second fluids entering the mixing chamber, creating a temperature gradient between the first and second fluids entering the mixing chamber, and operating a diaphragm operatively associated with the mixing chamber and the another mixing chamber to agitate the first fluid and the second fluid to form an intimate fluid mixture.

Also disclosed is a method of manufacturing a mixer. The method includes pouring a ceramic precursor into a first mold, a second mold and a third mold. The first mold has a shape of a trough or a base plate, the second mold has a shape of a top plate, the third mold has a shape of a first plate. The method further includes gelling the ceramic precursors in the first mold, the second mold and the third mold to form a green base plate, a green top plate and a green first plate, and removing the green base plate, the green top plate and the green first plate from the respective molds. The method still further includes co-firing the green base plate, the green top plate, and the green first plate to form a ceramic base plate, a ceramic top plate and a ceramic first plate. The ceramic first plate includes a plurality of ports for an entry of a first fluid and a second fluid, a mixing chamber fluidly connected with the plurality of ports, and a heating element. The ceramic base plate is interlocked with the ceramic top plate and the ceramic first plate, and a diaphragm is disposed upon one of the first plate and the top plate.

BRIEF DESCRIPTION OF FIGURES

FIG. 7 depicts a plurality of mixers that can be used to perform a variety of functions on fluids that are available in small quantities; the mixers can be arranged to be in series, parallel or in a combination or series and parallel.

DETAILED DESCRIPTION

Disclosed herein is a mixer that advantageously uses a combination of physical agitation and temperature gradients to facilitate the mixing of a plurality of fluids, when the fluids are present in small quantities on the order of microliters. In one embodiment, the mixer employs temperature gradients in a plurality of directions to facilitate diffusion between the plurality of fluids while at the same time employing physical agitation to increase turbulence between the fluids. In an exemplary embodiment, the mixer is manufactured from a ceramic material, which enables metal containing components of the mixer, such as the heating elements to be co-fired along with the ceramic material thus minimizing the manufacturing and assembly time.

Figure 1:
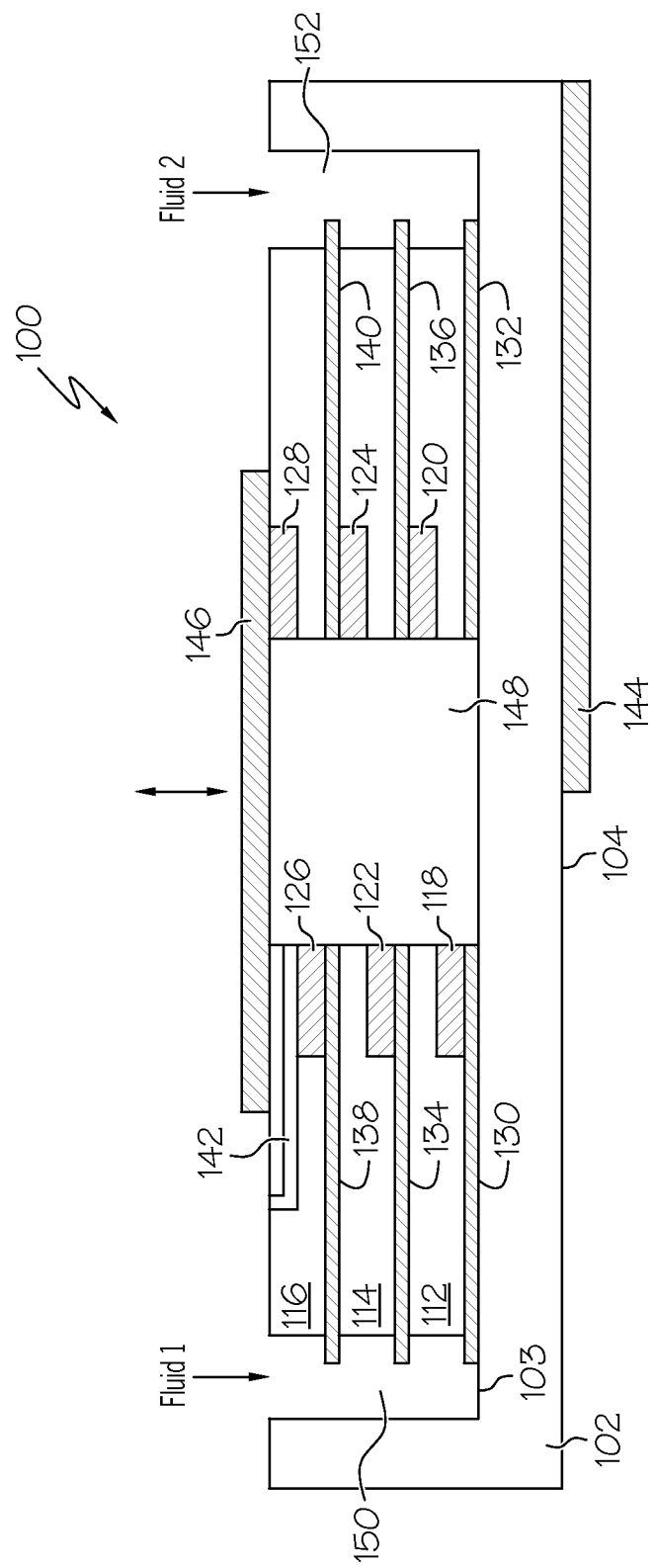
FIG. 1 is an exemplary depiction of one embodiment of the mixer.
Figure 2:
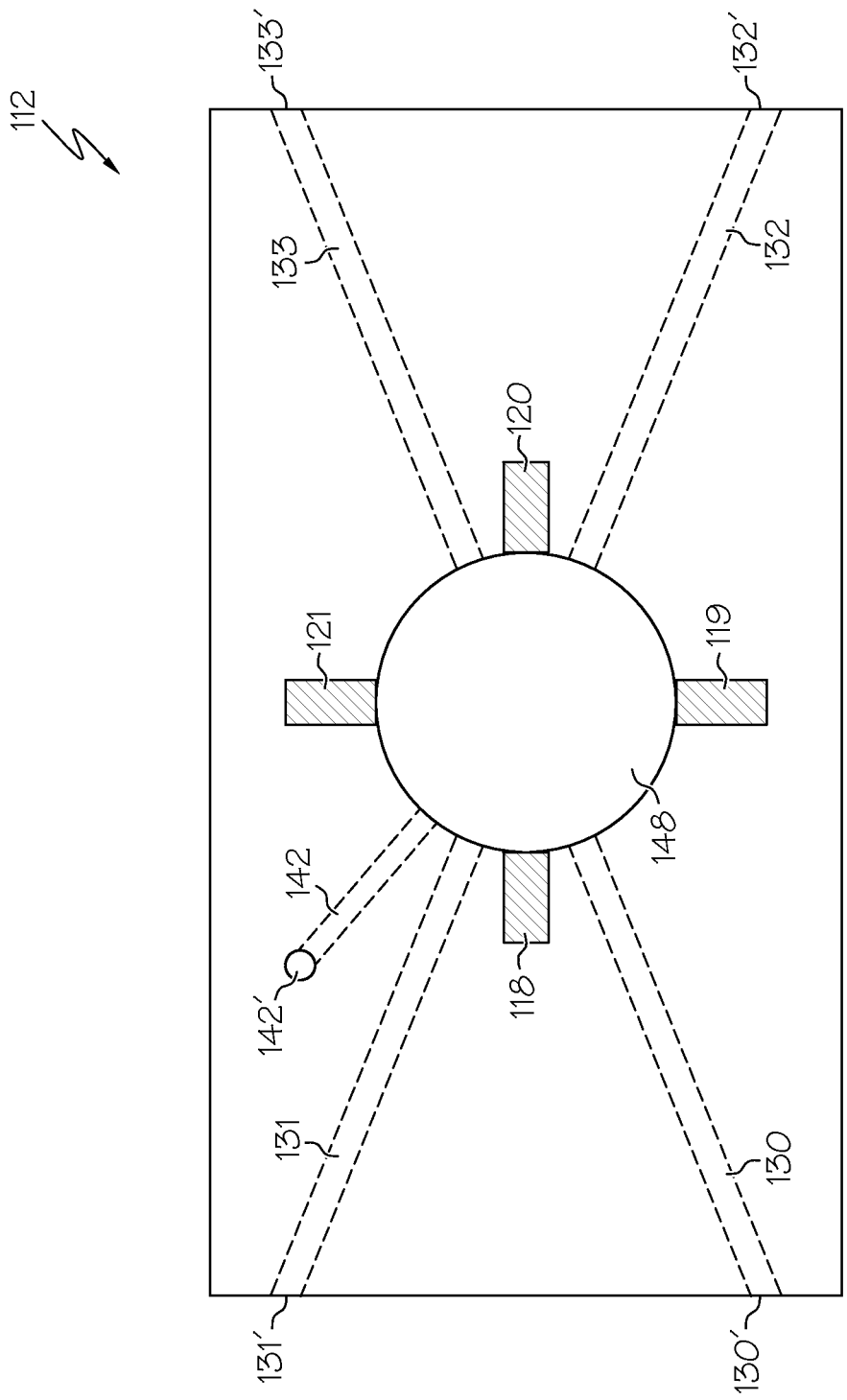
FIG. 2 is an exemplary depiction of one embodiment of a first plate.

With reference to the exemplary embodiments depicted in FIGS. 1 and 2, the mixer 100 comprises a trough 102 that comprises within it a plate 112, or a plurality of plates 112, 114, and 116. The trough 102 has a first surface 103 upon which the plate or the plurality of plates are disposed and a second surface 104 that is in thermal communication with a heating element. The first surface 103 and the second surface 104 are oppositely disposed. Each plate comprises a mixing chamber 148, a first channel 130 in fluid communication with a first port, a first heating element 118 and an optional first exit channel 142. The first heating element 118 generally produces temperature gradients in a first direction. The mixer 100 further comprises a diaphragm 146 that can be used for physical agitation of the fluids contained in the mixing chamber 148. The mixer 100 additionally comprises a second global heating element 144 that can be used to produce gradients in a second direction to further facilitate diffusion of the fluids contained in the mixer.

As can be seen in FIGS. 1 and 2, the mixer 100 comprises a plurality of plates 112, 114 and 116, and so on. Each plate can comprise a single channel or a plurality of channels 130, 131, 132 and 133 for permitting the respective fluids to enter the mixing chamber 148. Each channel is in fluid communication with a respective port 130', 131', 132' and 133' respectively. The mixing chamber 148 permits the respective fluids to undergo agitation by virtue of the diaphragm 146 and diffusion by virtue of the temperature gradients established by the use of the heating elements 118, 119, 120 and 121, depicted in FIG. 2.

While the plate 112 depicted in FIG. 2 has a rectangular cross-section, it is to be noted that the cross-section may have any desired geometry, such as, for example, square, circular, triangular or polygonal.

With reference now to FIG. 2, the first channel 130 and the second channel 131 are disposed on one side of the plate 112, while the third channel 132 and the fourth channel 133 are disposed on an opposing side of the plate 112. In one embodiment, the channels extend radially outwards from the mixing chamber 148 to the vertical edges of the plate 112 and permits the first fluid present in the first chamber 150 and the second fluid present in the second chamber 152 to travel into the mixing chamber 148. Additional channels such as a fifth, a sixth, a seventh, an eighth channel (not shown), and so on, may be introduced into the plate 112 for purposes of introducing a third fluid, a fourth fluid, and so on, into the mixing chamber 148. As will be detailed later in FIGS. 4A, 4B, 4C, 5A and 5B, the channels do not always extend out to the vertical edges of the plate, but can have ports disposed upon a horizontal surface of the plate.

Each plate can also comprise a single heating element or a plurality of heating elements for facilitating agitation of the fluid in the mixing chamber 148. Alternatively, the heating elements may be disposed in cavities situated between the plates if desired. In one embodiment, the heating elements can be resistance heaters and are in electrical communication with a source of electricity (not shown).

As can be seen in FIG. 2, the plate 112 may comprise a first heating element 118, a second heating element 119, a third heating element 120 and a fourth heating element 121, each heating element being radially disposed about the mixing chamber 148. The heating elements may be present in a single horizontal plane in the respective plates or alternatively each heating element can be at a different elevation within the plate. FIG. 1 depicts one embodiment, wherein the first heating element 118 is disposed along a first surface of the plate 112, while the third heating element is disposed along the second surface of the plate 112. The first surface and the second surface of the plate 112 are opposed to each other.

The heating elements 118, 119, 120 and 121 are held at different temperatures in order to create a temperature gradient within the mixing chamber 148 that facilitates the diffusion of the fluids into one another. When the mixer is placed on its second surface 104, the first elements can be used to create a first direction. In one embodiment, the first direction is a vertical direction. For example in FIG. 2, while the first heating element 118 is held at a temperature of 50° C., the second heating element 119 can be held at a temperature of 60° C., while the third heating element 120 can be held at a temperature of 70° C., and the fourth heating element 121 can be held at a temperature of 80° C. When a plurality of plates are disposed upon one another as depicted in FIG. 1, the temperature gradient can be extended to exist through the plurality of heating elements present in the plurality of plates. For example with reference to the FIG. 1, while the heating elements present in the first plate 112 are operated at temperatures of about 50 to about 60° C., those present in the second plate 114 can be operated at temperatures of about 60 to about 70° C., while those present in the third plate 116 can be operated at temperatures of about 70 to about 80° C., and so on.

In one embodiment, the heating element may be a metallic resistive coil that heats up upon passing an electric current through the coil. In another embodiment, the heating element can comprise an electrically conducting ceramic, metallic and/or a carbonaceous material that heats up upon passing an electric current through the conducting ceramic and/or a carbonaceous material.

Suitable materials for fabrication of the heating element include silicon carbide, molybdenum disilicide, tungsten disilicide, lanthanum chromate, zirconium diboride, titanium nitride, titanium diboride, tin oxide, copper oxide, copper, nickel, gold, silver, conductive carbon fibers, conductive carbon blacks, carbon nanotubes, or the like, or a combination comprising at least one of the foregoing materials.

The dimensions of the heating element will depend on its composition and method of fabrication. The heating element may be disposed upon the trough or the plurality of plates by spray coating, spin coating, or the like. When the heating element is coated onto the plates, it generally has a width of about 0.001 to about 0.005 millimeters, specifically about 0.002 to about 0.004 millimeters, and more specifically about 0.003 millimeters. The thickness of the heating element is about 0.0005 to about 0.04 millimeters, specifically about 0.001 to about 0.03 millimeters, and more specifically about 0.005 to about 0.02 millimeters. A preferred thickness is about 0.01 millimeter. The length of the heating element may be proportional to the number of plates included in the mixer 100.

Each plate may be provided with a plurality of ports through which the mixed fluid can be removed. If each plate is provided with a port, then it is desirable for these ports to be in fluid communication with one another so that the mixed fluid can be removed from the mixer. In one embodiment, it is desirable for only the uppermost plate (e.g., the third plate 116 in FIG. 1) to have an exit channel 142 that is in fluid communication with the mixing chamber 148 through which the mixed fluid can be extracted. In one embodiment, the port 142 can be in fluid communication with a pump (not shown). The pump can be controlled by a controlling device such as a computer and can be used to periodically extract mixed fluid from the mixer 100.

Each plate is also provided with an interlocking mechanism (i.e., a locking and unlocking mechanism) (not shown) by which it can be fixedly attached to the plate disposed above it as well as the plate disposed below it during operation. The first plate 112 that is in communication with the trough 102 has an interlocking mechanism by which it can be fixedly attached to the trough 102. Examples of such interlocking mechanisms include threads, screws, bolts, dowels, adhesive, mortise and tenon joints, dovetail joints, lap joints, tongue and groove joint, or the like, or a combination comprising at least one of the foregoing joints.

In one embodiment, the respective plates and/or the trough in their respective green forms (prior to sintering) are assembled and then co-sintered to form the mixer 100 or a part of the mixer. During the sintering process, the respective plates and/or the trough react with each other and are permanently locked into position.

Each plate may also be provided with a socket and a plug so that the heating elements in the respective plates can be in electrical communication with one another. It is desirable for the plate disposed upon and in intimate contact with the first surface 103 of the trough 102 (e.g., the first plate 112 in the FIG. 1) to be in electrical communication with a source of electrical energy.

Figure 3:
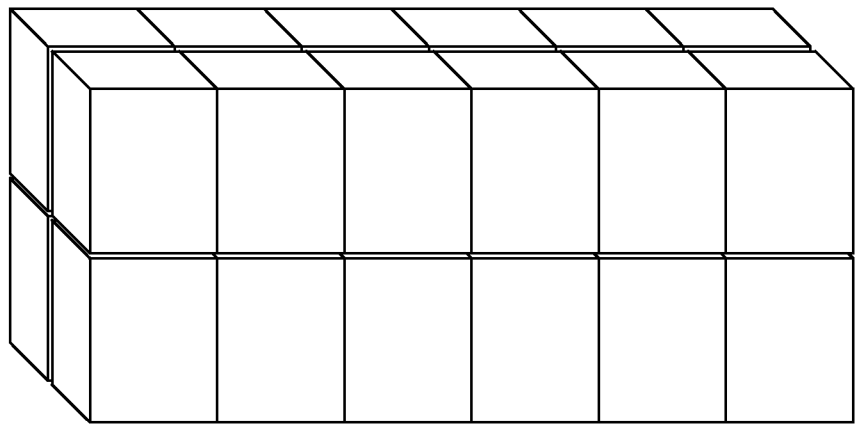
FIG. 3 is an exemplary depiction of the units of different fluids when they first encounter each other in the mixing chamber and their subsequent conversion into an intimately mixed fluid mixture.
Figure 3:
Figure 3:
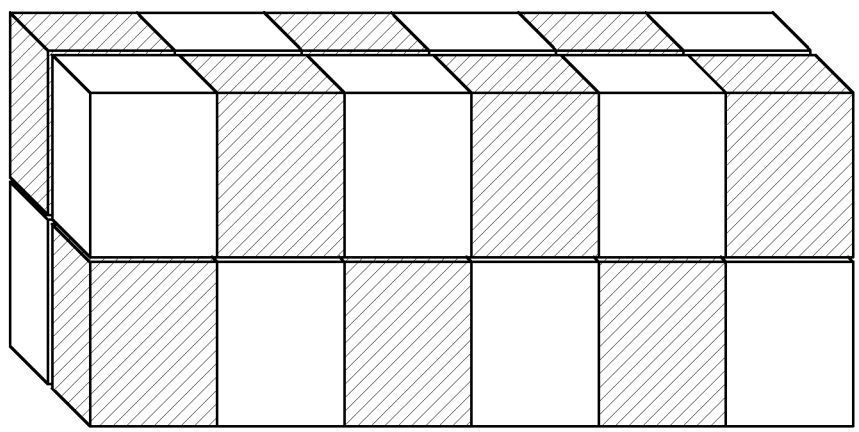

While the mixer 100 in FIG. 1 is depicted as having 3 plates, it may be desirable to have as many plates as possible. The use of a larger number of plates permits the respective fluids to be mixed as distributed microunits as depicted in FIG. 3. FIG. 3 depicts an idealized view of the respective fluid phases in the mixing chamber prior to and after undergoing agitation.

The respective plates have a length of about 20 to about 70 millimeters, specifically about 30 to about 50 millimeters, and more specifically about 35 to about 45 millimeters. A preferred length is about 40 millimeters. The respective plates have a width of about 10 to about 50 millimeters, specifically about 20 to about 40 millimeters, and more specifically about 25 to about 35 millimeters. A preferred width is about 30 millimeters.

Each plate prior to sintering has a thickness of about 0.05 to about 0.5 millimeters, specifically about 0.08 to about 0.2 millimeters. A preferred plate thickness prior to sintering is about 0.1 millimeters. The channels and ports generally have diameters of about 1 to about 3 millimeters, specifically about 1.3 to about 2.7 millimeters, and more specifically about 1.6 to about 2.3 millimeters. A preferred diameter for the channel and the ports is about 2 millimeters.

The mixing chamber generally has a diameter of about 5 to about 15 millimeters, specifically about 6 to about 13 millimeters, and more specifically about 7 to about 12 millimeters. An exemplary diameter for the mixing chamber is about 10 millimeters. It is to be noted that the aforementioned dimensions can be varied depending upon the characteristics and the amount of the fluids.

The plates and the trough can be manufactured from a metal, a ceramic, an organic polymer, or a combination comprising at least one of the foregoing materials. It is generally desirable for the plates and the trough to be manufactured from a ceramic material. Examples of suitable ceramic materials are silica, alumina, titania, ceria, zirconia, alumina with silica additives, glass ceramic, borosilicate glass, aluminum nitride, cordierite based glass ($Al_2O_3$/MgO/$SiO_2$), or the like, or a combination comprising at least one of the foregoing ceramic materials.

The use of a ceramic material has a number of advantages. The heating elements can be incorporated into the green ceramic material (prior to its firing) and the combination of the ceramic plate or trough with the incorporated heating element can be subjected to firing. This reduces the number of steps used to manufacture the mixer thereby reducing the number of production steps and the cost of production.

The uppermost plate (e.g., plate 116 in FIG. 1) has disposed upon its upper surface a diaphragm 146 that serves to agitate the respective fluids and to bring the molecules of the fluid into intimate contact with each other. The diaphragm 146 can be manufactured from a ductile metal, a metal alloy, or an organic polymer. Examples of suitable metals are aluminum, stainless steel, copper, brass, or the like.

It is desirable for the diaphragm 146 to comprise an organic polymer. The organic polymer can comprise a wide variety of thermoplastic resins, blend of thermoplastic resins, thermosetting resins, or blends of thermoplastic resins with thermosetting resins. The organic polymer may also be a blend of polymers, copolymers, terpolymers, or combinations comprising at least one of the foregoing organic polymers. The organic polymer can also be an oligomer, a homopolymer, a copolymer, a block copolymer, an alternating block copolymer, a random polymer, a random copolymer, a random block copolymer, a graft copolymer, a star block copolymer, a dendrimer, or the like, or a combination comprising at least one of the foregoing organic polymers. Exemplary organic polymers for use in the diaphragm 146 are elastomers that have glass transition temperatures below room temperature.

Examples of the organic polymer are polyacetals, polyolefins, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, styrene acrylonitrile, acrylonitrile-butadiene-styrene (ABS), polyethylene terephthalate, polybutylene terephthalate, polyurethane, ethylene propylene diene rubber (EPR), polytetrafluoroethylene, fluorinated ethylene propylene, perfluoroalkoxyethylene, polychlorotrifluoroethylene, polyvinylidene fluoride, or the like, or a combination comprising at least one of the foregoing organic polymers.

Examples of blends of thermoplastic resins include acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, thermoplastic elastomer alloys, nylon/elastomers, polyester/elastomers, polyethylene terephthalate/polybutylene terephthalate, acetal/elastomer, styrene-maleicanhydride/acrylonitrile-butadiene-styrene, polyether etherketone/polyethersulfone, polyether etherketone/polyetherimide polyethylene/nylon, polyethylene/polyacetal, or the like.

Examples of thermosetting resins include polyurethane, natural rubber, synthetic rubber, epoxy, phenolic, polyesters, polyamides, polysiloxanes, or the like, or a combination comprising at least one of the foregoing thermosetting resins. Blends of thermoset resins as well as blends of thermoplastic resins with thermosets can be utilized. An exemplary thermosetting resin is polydimethylsiloxane (PDMS). It is to be noted that the diaphragm may be substituted by a piston or another suitable reciprocatory device.

The diaphragm 146 is in physical communication with a source of vibration (not shown). An example of a source of vibration is a reciprocatory device such as a piston connected to a crank shaft that is in slideable communication with the mixing chamber. In one embodiment, the source of vibration is manual. In another embodiment, the source of vibration can be mechanical or electromechanical. Examples of mechanical or electromechanical sources of vibration are pumps, piezoelectric drives, shape memory alloy drives, pneumatic drives, or the like. The source of vibration causes the diaphragm to oscillate promoting an agitation of the respective fluids. In an exemplary embodiment, the diaphragm oscillates in the vertical direction. The source of vibration can also be used to displace mixed fluid from the mixing chamber 148 for extraction through the first exit channel 142.

As noted above, a second heating element 144 is disposed at the second surface 104 located at the bottom of the trough. The second heating element 144 can be used to heat any portion of the trough and thereby create a second temperature gradient. As depicted in the FIG. 1, it is used to create a temperature gradient in the horizontal direction. It is preferably used to heat one of the fluids introduced into the mixer so that the difference in temperature between the fluids in the mixing chamber 148 will facilitate diffusion of the fluids into each other.

Figure 4A:
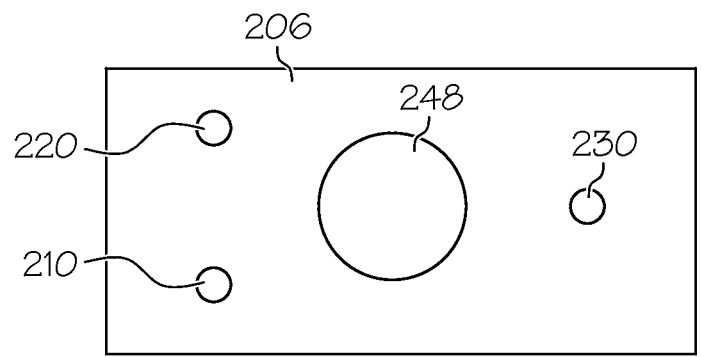
FIG. 4A depicts an exemplary embodiment of the top plate that can be used to assemble the mixer.
Figure 4B:
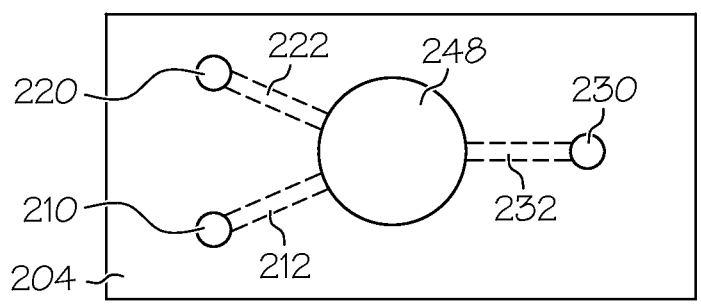
FIG. 4B depicts an exemplary embodiment of the middle plate that can be used to assemble the mixer.
Figure 4C:
FIG. 4C depicts an exemplary embodiment of the bottom plate that can be used to assemble the mixer.
Figure 5A:
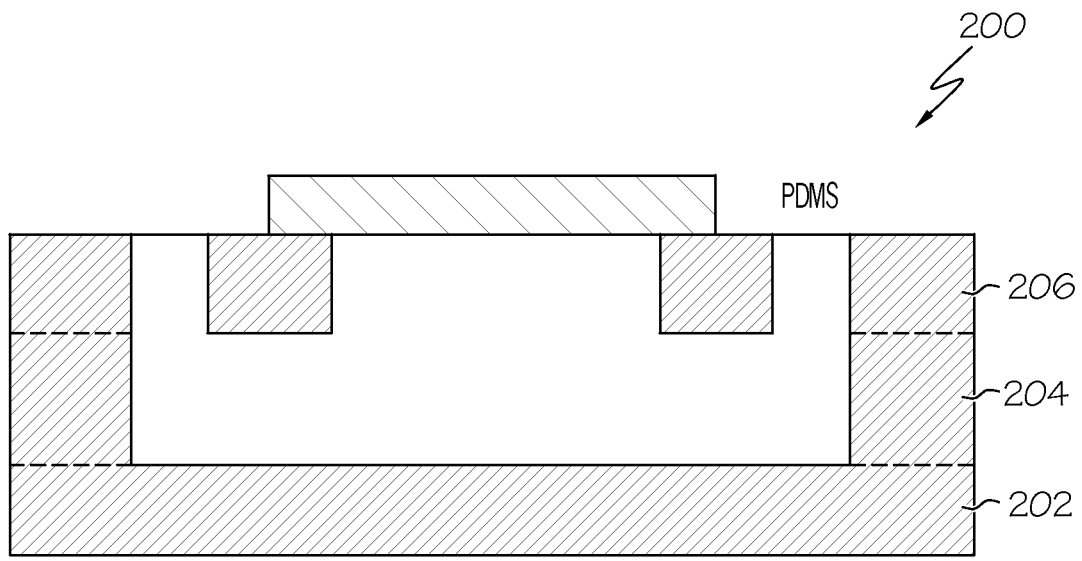
FIG. 5A depicts one variation representing a mixer that can be obtained by assembling the plates that are shown in the FIGS. 4A, 4B and 4C.
Figure 5B:
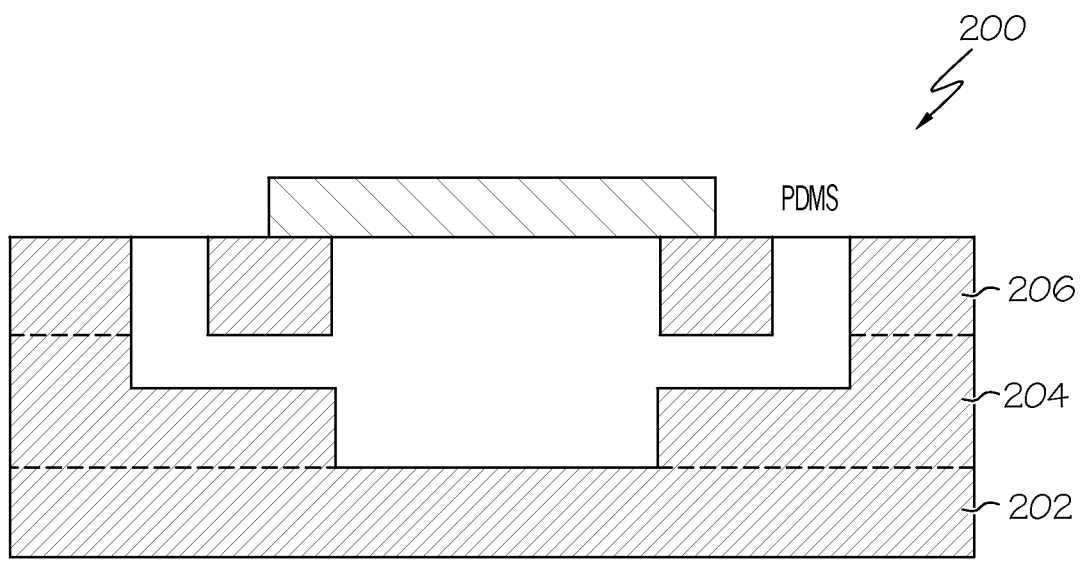
FIG. 5B depicts another variation representing a mixer that can be obtained by assembling the plates that are shown in the FIGS. 4A, 4B and 4C.

FIGS. 4A, 4B 4C, 5A and 5B depict exemplary variations of the embodiment depicted in FIG. 1. In the embodiment depicted in FIGS. 4A, 4B 4C, 5A and 5B, the mixer 200 (FIGS. 5A and 5B) comprises a base plate 202 (FIG. 4C), a middle plate 204 (FIG. 4B) and a top plate 206 (FIG. 4A). FIGS. 5A and 5B depict the assembly of the parts shown in FIGS. 4A, 4B and 4C. As can be seen in FIGS. 5A and 5B, the top plate 206 is disposed and in intimate contact with a middle plate 204 which is disposed upon and in intimate contact with the base plate 202, the respective intimate contacts preventing the loss of fluids due to leakage.

With reference now to FIGS. 4A, 4B 4C, 5A and 5B, the top plate and the middle plate each comprise a first port 210 and a second port 220 into which the first fluid and the second fluid are introduced respectively. The respective fluids travel to the mixing chamber 248 via the first channel 212 and the second channel 222 respectively. Upon being mixed in the mixing chamber 248, the mixed fluid can be extracted from the mixer 200 via the third port 230 and the third channel 232. The mixed fluid can be extracted from the mixer via an exit channel and port (not shown).

Figure 6A:
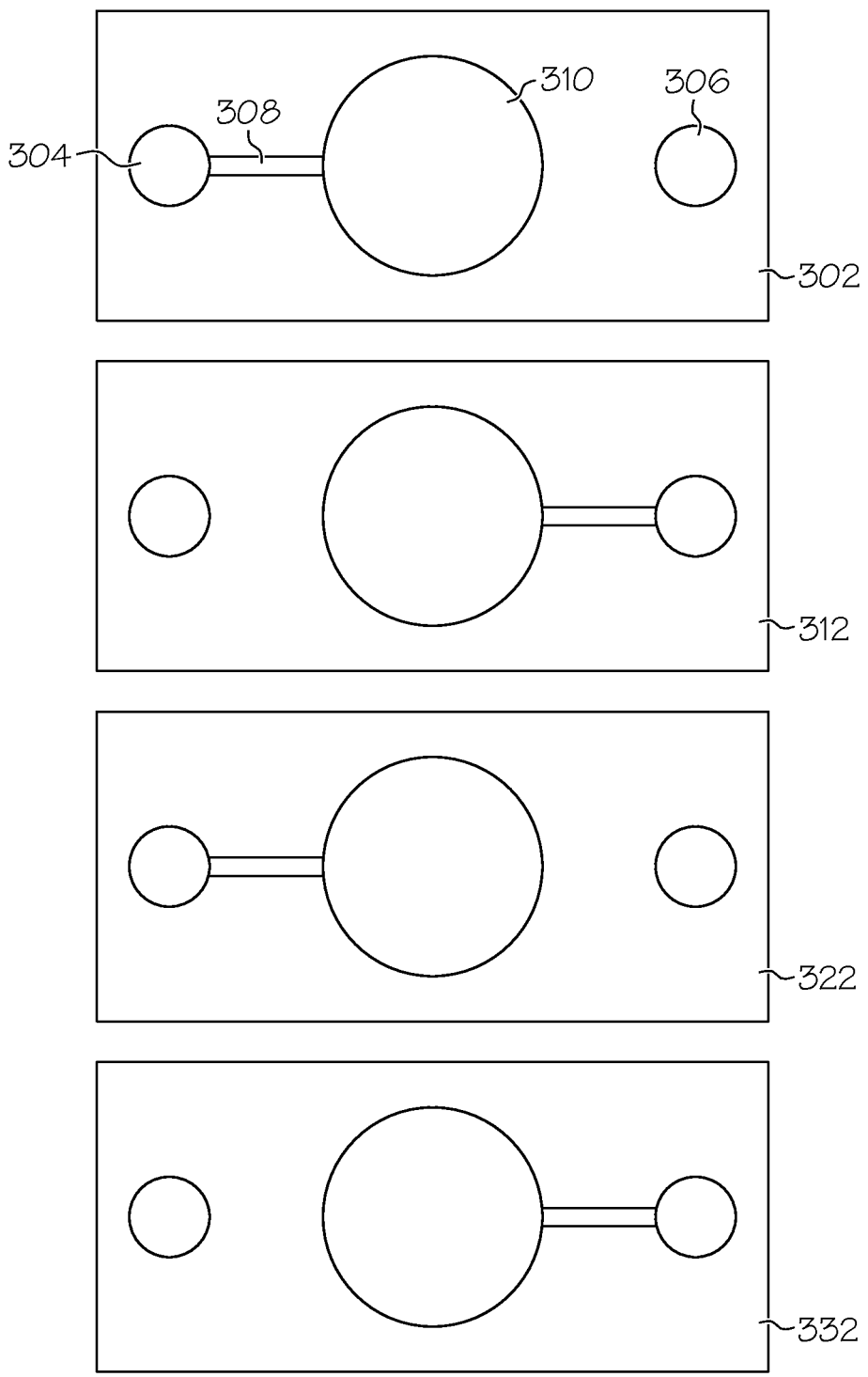
FIG. 6A depicts one exemplary embodiment of the respective plates that can be used to assemble the mixer.
Figure 6B:
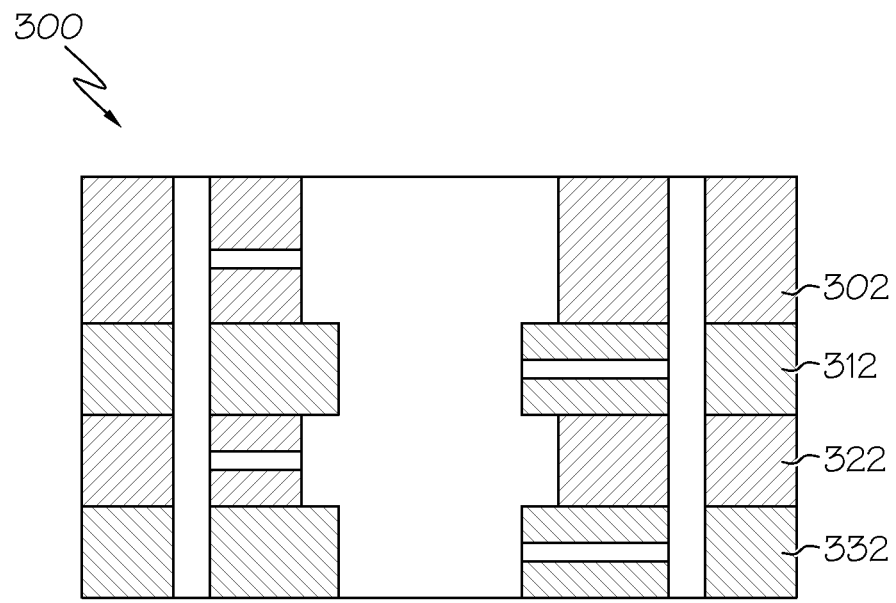
FIG. 6B depicts one exemplary embodiment of the mixer formed by assembling the plates depicted in the FIG. 6A.
Figure 6C:
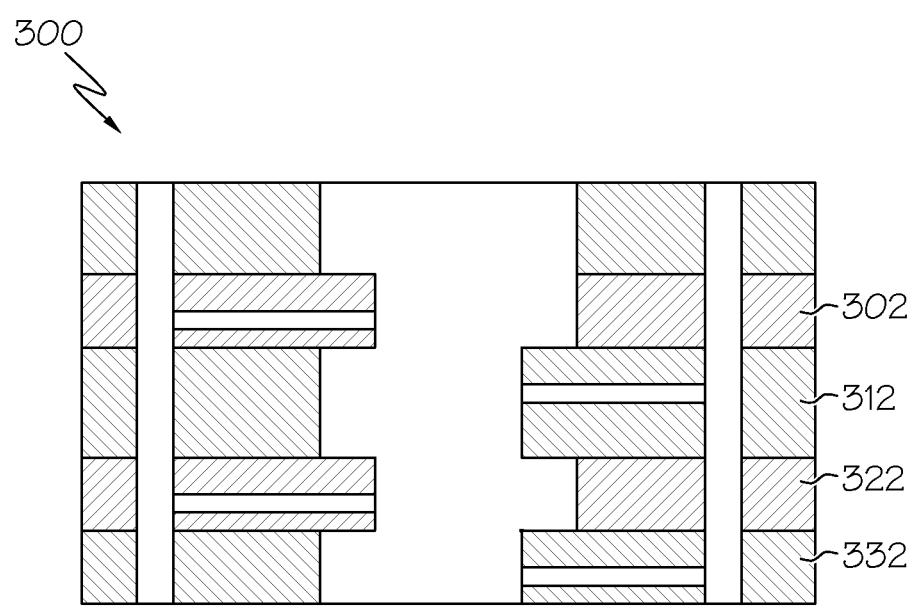
FIG. 6C depicts another exemplary embodiment of the mixer formed by assembling the plates depicted in the FIG. 6A.

FIGS. 6A, 6B and 6C depict another exemplary variation of the embodiment depicted in FIG. 1. In this embodiment, the mixer 300 comprises 4 or more plates 302, 312, 322 and 332. Each plate comprises a first port 304, a second port 306, a channel 308 and a mixing chamber 310. The first fluid is introduced into the first port 304, while the second fluid is introduced into the second port 306. As can be seen in the assembled mixers 300 in FIGS. 6B and 6C, the respective channels 308 are arranged in alternating plates so as to enable a staggered entry of the respective fluids into the mixing chamber. This facilitates the agitation of the first fluid and the second fluid. The mixed fluid can be extracted via an exit channel (not shown).

In another embodiment depicted in FIGS. 6B and 6C, the alternating plates can have different diameters for the respective mixing chamber. In other words, the mixing chamber has different dimensions along its height. This causes the mixing chamber to have an irregular shape and permits the respective fluids to be introduced into the mixing chamber at different locations, thus facilitating further agitation of the first fluid and the second fluid.

With reference once again to FIGS. 1, 4A, 4B, 4C, 5A, 5B, 6A, 6B and 6C, in one embodiment, in one manner of using the mixing device 100, a first fluid is disposed in the first chamber 150 while a second fluid is disposed in the second chamber 152. Capillary action can draw the respective fluids into the channels 130, 132, 134, 136, 138 and 140. Additionally, pressure can be used to force the respective fluids into the mixing chamber 148. Once the fluids are disposed into the respective first and second chambers, the second heating element can be activated thus creating a temperature gradient in the horizontal direction. As the fluid enters the mixing chamber, the diaphragm 148 and the first heating elements can be activated, thus promoting agitation and diffusion of the fluids present in the mixing chamber. The mixed fluids can be extracted from the first exit channel 142.

As noted above, the respective fluids can be heated during the mixing. In an exemplary embodiment, the fluids are generally heated to a temperature of about ±15° C., specifically about ±10° C., and more specifically about ±5° C. of the dewpoint.

The mixer can be manufactured in a variety of different ways. In one advantageous method of manufacturing the mixer, the various components that comprise ceramics can be co-fired with the metal parts that are used for the heating elements. In another embodiment, the heating elements comprise ceramic materials that can be co-fired with the ceramic material used in the trough, the base plate or the plurality of plates.

In one embodiment, in one method of manufacturing the mixer, the method comprises pouring a ceramic precursor into a first mold, a second mold, a third mold, and so on; the first mold having a shape of the trough or the base plate; the second mold having a shape of the top plate; and the third mold having a shape of the first plate. If desired, the first mold, the second mold and the third mold each have a cavity or a plurality of cavities for incorporating the first heating element and the second heating element. The ceramic precursors are then subjected to gelling within the respective molds to form green parts (e.g., a green base plate, a green top plate and a green first plate). The green parts are then removed from the respective molds. They may optionally be subjected to a vacuum to remove any solvents and unreacted reactants. An optional heating element may be disposed in the respective cavities if desired. As noted above, the heating element may be ceramic or metallic. Metallic heating elements are disposed in the cavity, while ceramic heating elements may be sprayed or coated onto the respective green parts.

The respective green parts with the corresponding heating elements are then co-fired to produce ceramic parts (e.g., a ceramic base plate, a ceramic top plate and a ceramic first plate). The ceramic parts are then assembled into the mixer by virtue of the interlocking devices provided. A diaphragm is then disposed on top of the top plate for effective agitation of the fluids. The diaphragm is generally bonded to the top plate using an adhesive. Appropriate adhesives such as cyano-acrylate esters or epoxies can be used for the bonding.

In one embodiment, the respective green parts can be first gelled in respective molds and then fired (also referred to as sintering). In another embodiment, the various respective parts such as the plates and trough can be co-sintered to form a single unit.

In one embodiment, the respective plates and/or the trough in their respective green forms (prior to sintering) are assembled and then co-sintered to form a mixer 100 that comprises a single piece. During the sintering process, the respective plates and/or the trough react with each other and are permanently locked into position. In an alternative embodiment, only selected plates can be co-sintered together and then assembled to form the mixer 100. The sintered mixer can then be subjected to machining, finishing and assembly operations to form the mixer 100.

The finishing operations can include machining for providing the respective plates with the ports and the channels as well as for removing rough edges and the like. In one embodiment, the ports and the channels can be machined by using electrodischarge machining, ultrasonic machining, micro-ultrasonic machining, abrasive flow machining, electrochemical machining, micro-electrochemical machining, water jet machining, or the like, or a combination comprising at least one of the foregoing processes. The machining of the ports and channels can be done prior to or after sintering.

The finished plates may be coated with various surface finishes that can promote a change in the nature of the surfaces from wetting to non-wetting surfaces. For example, a sintered plate can have a surface coated with polytetrafluoroethylene or polydimethylsiloxane to improve the non-stick properties of the surface. Alternatively, the surface may be coated with a layer of silane coupling agent to reduce the non-stick properties of the surface (e.g., to facilitate a greater residence time of the molecules on the surface).

In one embodiment, a plurality of mixers 100 can be connected in a modular fashion to facilitate a plurality of operations. With reference now to FIG. 7, a plurality of mixers 100, 300, 500 and 700 can be arranged in series, parallel or a combination of series and parallel for a microfluidic mixing device. For example, in FIG. 7, the mixer 100 can be used to mix a first fluid with a second fluid to produce a first mixed fluid, the mixer 300 can be used to wash the first mixed fluid, the mixer 500 can be used to mix a third fluid with a fourth fluid to produce a second mixed fluid, while the mixer 700 can be used to mix the first mixed fluid with the second mixed fluid to produce a third mixed fluid. In this manner, a plurality of mixers can be used to facilitate mixing, reacting, separating, washing, and the like of a combination of different fluids each of which are available in microliter quantities. The mixing, reacting, separating, washing, and the like, can be conducted at a variety of different physical conditions involving different pressure regimes, temperature regimes, and the like.

The mixer has a number of advantages over other conventional mixers. It can be advantageously used to blend small quantities of fluid without any loss of the fluid. It can also be advantageously used for combinatorial chemistry or laboratory on chip experiments, where small quantities of the respective fluids are dispensed, mixed, reacted and analyzed. The use of a ceramic material facilitates the manufacture of the plate and the trough in a single operation. It also permits the plates and trough to be manufactured in single pieces that can be quickly assembled by using the aforementioned interlocking mechanisms. Since the mixers can be connected with each other in a modular fashion, they can be quickly and easily connected and disconnected depending upon the number of operations to be performed on the respective fluids.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of mixing microfluids in a microfluid mixer, the method comprising:
    directing a first microfluid and a second microfluid into a plurality of first ports fluidly connected to a mixing chamber disposed between a first plate and a base plate;
    guiding the first and second microfluids into a mixing chamber;
    directing the first and second microfluids into a plurality of second ports fluidly connected to the plurality of first ports;
    guiding the first and second microfluids from the plurality of second ports into another mixing chamber disposed between a second plate and the first plate and fluidly connected to the mixing chamber;
    activating a heating element arranged at the mixing chamber;
    creating a temperature gradient within the mixing chamber to facilitate diffusion of the first and second microfluids; and
    operating a diaphragm operatively associated with the mixing chamber and the another mixing chamber to agitate the first microfluid and the second microfluid to form an intimate fluid mixture.

2. The method of claim 1, further comprising extracting the intimate fluid mixture from an extraction port in the first plate.

3. The method of claim 1, further comprising activating another heating element arranged at the another mixing chamber.

4. The method of claim 3, creating another temperature gradient in the another mixing chamber.

5. The method of claim 4, wherein creating the another temperature gradient includes activating the another heating element such that the another temperature gradient is distinct from the temperature gradient.

6. The method of claim 1, further comprising: directing a third microfluid and a fourth microfluid into a plurality of third ports fluidly connected to yet another mixing chamber disposed between a third plate and the second plate, the yet another mixing chamber being fluidly connected to the mixing chamber and the another mixing chamber.

7. The method of claim 6, further comprising:
    guiding the first and second microfluids into the yet another mixing chamber; and
    agitating the first, second, third and fourth microfluids through operation of the diaphragm to form an intimate fluid mixture.

8. The method of claim 6, wherein directing the third microfluid and the fourth microfluid into a plurality of third ports includes guiding third and fourth microfluids that are distinct from the first and second fluids into the plurality of third ports.

* * * * *